(12) United States Patent
Wada et al.

(10) Patent No.: US 7,105,599 B2
(45) Date of Patent: Sep. 12, 2006

(54) STRETCH MATERIAL

(75) Inventors: Koichi Wada, Ibaraki Pref. (JP); Yosuke Jogo, Ibaraki Pref. (JP)

(73) Assignee: Kuraray Co., Ltd., Kurashiki (JP)

( * ) Notice: Subject to any disclaimer, the term of this patent is extended or adjusted under 35 U.S.C. 154(b) by 34 days.

(21) Appl. No.: 10/479,178

(22) PCT Filed: May 28, 2002

(86) PCT No.: PCT/JP02/05158

§ 371 (c)(1),
(2), (4) Date: Dec. 1, 2003

(87) PCT Pub. No.: WO02/098976

PCT Pub. Date: Dec. 12, 2002

(65) Prior Publication Data

US 2004/0138379 A1    Jul. 15, 2004

(30) Foreign Application Priority Data

Jun. 1, 2001    (JP)    ............................. 2001-166148

(51) Int. Cl.
*C08L 53/02*    (2006.01)

(52) U.S. Cl. ............................. 525/88; 525/89; 525/98; 525/338

(58) Field of Classification Search .................. 525/88, 525/89, 98, 338

See application file for complete search history.

(56) References Cited

U.S. PATENT DOCUMENTS 4,719,261 A * 1/1988 Bunnelle et al. .............. 525/97

FOREIGN PATENT DOCUMENTS

JP    8-59903    3/1996
JP    10-60220    3/1998

\* cited by examiner

*Primary Examiner*—James J. Seidleck
*Assistant Examiner*—Olga Asinovsky
(74) *Attorney, Agent, or Firm*—Oblon, Spivak, McClelland, Maier & Neustadt, P.C.

(57) ABSTRACT

A stretch matenal consists essentially of a thermoplastic polymer matstial that meets the following couditions:
(i) the thermoplastic polymer material contains:
(a) 100 parts by weight of a hydrogenated block copolymer having a number average molecular weight of 50,000 to 140,000 and comprising am least two polymer blocks (A) composed mainly of a vinyl aromatic compound and at least one hydrogenated polymer block (B) composed mainly of a conjugated diene compound;
(b) 0 to 120 parts by weight of a non-aromatic rubber softening agent;
(c) 0 to 80 parts by weight of polyethylene that has an MFR of 15 g/10 min or above when measured at 190° C. wider a load of 2.16 kg; and
(d) 0 to 40 parts by weight of polystyrene that has an MFR of 5 g/10 min or above when measured at 200° C. under a load of 5.00 kg.

11 Claims, No Drawings

STRETCH MATERIAL

TECHNICAL FIELD

The present invention relates to a stretch material that exhibits a good melt-processability during high-speed production and offers a good stretchability. The stretch material of the present invention is suitable for use in sanitary products, medical products and various other applications.

BACKGROUND ART

Certain thermoplastic elastomers do not require a vulcanization process in their production, yet they still exhibit rubber elasticity. Such thermoplastic elastomers are used to form stretch materials such as films, bands, strands, and non-woven fabrics, which are then used in combination with laterally expandable non-woven fabrics or pleated non-woven fabrics to form stretchable articles. These stretch materials or articles have become widely used in various sanitary products such as disposable diapers, toilet training pants, and medical products such as surgical bandages and surgical gowns. Traditionally, thermoplastic polyurethane elastomers or hydrogenated styrene-based thermoplastic elastomers have been used in these applications.

In order for these stretch materials to be used in the aforementioned applications, they must have properties such as a high flexibility to reduce the irritation and pressure that the materials can exert on a human body, a good stretchability, a good stress relaxation property to reduce residual strain, and a good processability. None of conventional thermoplastic elastomers are less than satisfactory in terms of their quality and processability, however.

For example, thermoplastic polyurethane elastomers, though highly stretchable, lack required flexibility and are also unfavorable in terms of water-resistance and weather-resistance. Likewise, hydrogenated styrene-based thermoplastic elastomers have poor processability despite their relatively high weather-resistance, flexibility, and stretchability.

In view of these drawbacks of conventional stretch materials, it is an objective of the present invention to provide a stretch material made of a thermoplastic elastomer that has a good stress relaxation property, bears less residual strain, and at the same time exhibits a stretchability and a flexibility comparable to vulcanized rubber. Such a stretch material can be stretched easily to better fit a human body without causing undesired irritation or exerting undesired pressure on the human body. Furthermore, the stretch material exhibits a good melt-processability during high-speed production and is thus easy to produce.

DISCLOSURE OF THE INVENTION

The present inventors have devoted significant effort in finding a way to achieve the above-described objectives and, as a result, have made a finding that certain thermoplastic polymers that are composed mainly of a specific type of hydrogenated styrene-based thermoplastic elastomer, or compositions containing such polymers, have a good processability, in particular, a good melt-processability suitable for high-speed production, which allows the polymers to be formed/processed by application of heat in much the same way as typical thermoplastic resins are shaped. The present inventors also found that such thermoplastic polymers or compositions thereof have a good stress relaxation property, bears less residual strain, and at the same time exhibit a stretchability and a flexibility comparable to vulcanized rubber, so that they can be stretched easily to better fit a human body without causing undesired irritation or exerting undesired pressure on the human body. For these reasons, these thermoplastic resins or compositions thereof can be used to make films, strands, bands, non-woven fabrics, and other stretch materials that are suitable for use in various sanitary products, including disposable diapers, toilet training pants, and various medical products, including substrate for medical patches, stretchable tapes, surgical bandages and surgical gowns. These findings ultimately led the present inventors to devise the present invention.

(1) Accordingly, the present invention is a stretch material comprising a thermoplastic polymer material that meets the following conditions:
  (i) it contains:
    (a) 100 parts by mass of a hydrogenated block copolymer having a number average molecular weight of 50,000 to 140,000 and including at least two polymer blocks (A) composed mainly of a vinyl aromatic compound and at least one hydrogenated polymer block (B) composed mainly of a conjugated diene compound, wherein the amount of the polymer block (A) is in the range of 10 to 40% by mass, and 50% or more of the double bonds present in the polymer block (B) that originate from the conjugated diene compound are hydrogenated;
    (b) 0 to 120 parts by mass of a non-aromatic rubber softening agent;
    (c) 0 to 80 parts by mass of polyethylene that has an MFR of 15 g/10 min or above when measured at 190° C. under a load of 2.16 kg; and
    (d) 0 to 40 parts by mass of polystyrene that has an MFR of 5 g/10 min or above when measured at 200° C. under a load of 5.00 kg;
  (ii) it has a residual strain of 15% or less after having stretched to 150% elongation at 25° C. in a stretch test;
  (iii) it has a permanent tensile set of 10% or less when the thermoplastic material is stretched by 100% elongation, held stretched for 120 minutes at 25° C., released and then left for 30 minutes;
  (iv) it shows a 15% or less deviation in the value of the melt tension when tested in a melt tension test performed under a temperature condition that allows an MFR of 5 to 15 g/10 min; and
  (v) it melts and breaks when wound at a winding speed of 60 m/min or more in a melt tension test performed under a temperature condition that allows an MFR of 5 to 15 g/10 min.

(2) Also, the present invention is the stretch material according to (1) above, wherein the stretch material is provided in the form of a film, a strand, a band, or a non-woven fabric formed of the thermoplastic polymer material.

(3) Further, the present invention is the stretch material according to (1) or (2) above, wherein the conjugated diene compound that constitutes the hydrogenated polymer block (B) is butadiene, isoprene, or a mixture of the two.

BEST MODE FOR CARRYING OUT THE INVENTION

The present invention will now be described in detail.

The hydrogenated block copolymer to serve as the component (a) (which is referred to simply as "hydrogenated block copolymer (a)", hereinafter) of the thermoplastic polymer material (which is referred to as "thermoplastic polymer material (I)", hereinafter) that is used to form the stretch material of the present invention has a number average molecular weight of 50,000 to 140,000 and includes at least two polymer blocks (A) composed mainly of a vinyl aromatic compound and at least one hydrogenated polymer block (B) composed mainly of a conjugated diene compound. The amount of the polymer block (A) in the hydrogenated block copolymer (a) is in the range of 10 to 40% by mass. Also, 50% or more of the double bonds present in the polymer block (B) originating from the conjugated diene compound are hydrogenated.

Examples of the vinyl aromatic compound that makes up the polymer block (A) in the hydrogenated block copolymer (a) include styrene, α-methylstyrene, o-methylstyrene, m-methylstyrene, p-methylstyrene, 1,3-dimethylstyrene, vinylnaphthalene, and vinylanthracene. The polymer block (A) may be formed of one or a combination of two or more of these vinyl aromatic compounds. Of possible combinations, the polymer block (A) is preferably formed of styrene and/or α-methylstyrene, in particular, styrene alone.

The amount of the polymer block (A) in the hydrogenated block copolymer (a) needs to be in the range of 10 to 40% by mass, preferably in the range of 13 to 37% by mass, with respect to the mass of the hydrogenated block copolymer (a). When present in the hydrogenated block copolymer (a) in an amount of 10% or less by mass, the polymer block (A) cannot provide desired mechanical strength for the thermoplastic polymer material (I). On the other hand, the stress relaxation property of the stretch material, which is formed of the thermoplastic polymer material (I), is reduced and thus, the residual strain of the stretch material is increased when the amount of the polymer block (A) in the hydrogenated block copolymer (a) exceeds 40% by mass. As a result, the thermoplastic polymer material (I) becomes less stretchable.

The polymer block (B) in the hydrogenated block copolymer (a) is composed mainly of a conjugated diene compound and is hydrogenated. Examples of the conjugated diene compound that constitutes the polymer block (B) include butadiene, isoprene, 1,3-pentadiene, 2,3-dimethyl-1,3-butadiene, and chloroprene. The polymer block (B) may be formed of one or a combination of two or more of these conjugated diene compounds. It is preferred that, of possible combinations, the polymer block (B) is composed mainly of butadiene, isoprene or a mixture of the two. Also, it is necessary that 50% or more of the double bonds present in the polymer block (B) that originate from the conjugated diene compound are hydrogenated. When the degree of hydrogenation of the polymer block (B) is less than 50%, not only does the thermoplastic polymer material (I) become susceptible to deterioration by heat during the processing of the material, but also the stretchability of the stretch material, which is formed of the thermoplastic polymer material (I), is reduced. The degree of hydrogenation of the polymer block (B) is preferably 80% or higher, and more preferably 90% or higher.

In order to ensure a sufficient stretchability, it is important that the hydrogenated block copolymer (a) includes at least two polymer blocks (A) and at least one hydrogenated polymer block (B). It should be noted that the diblock copolymer, in which one polymer block (A) and one hydrogenated polymer block (B) are linked to one another, and the triblock copolymer, in which one polymer block (A) and two hydrogenated polymer blocks (B) are linked to one another, each bear a significant residual strain and are therefore not suitable for use in the present invention. These copolymers, however, have a low melt viscosity and, for the purpose of adjusting the melt processability of the polymer material, may be added in amounts that do not affect the stretchability of the thermoplastic polymer material.

The hydrogenated block copolymer (a) for use in the present invention needs to have a number average molecular weight in the range of 50,000 to 140,000, and preferably in the range of 55,000 to 135,000. The hydrogenated block copolymer (a) with a number average molecular weight of less than 50,000 may lead to a decreased stress relaxation property and, thus, an increase in the residual strain of the thermoplastic polymer material (I). As a result, the stretchability of the stretch material formed of the thermoplastic polymer material (I) may be decreased. On the other hand, the processability of the thermoplastic polymer material (I) is decreased when the hydrogenated block copolymer (a) has a number average molecular weight of more than 140,000. As used herein, the term "number average molecular weight" refers to a number average molecular weight as determined by the GPC technique using polystyrene standard.

The hydrogenated block copolymer (a) may include on ends of, or within, its molecule a polar group such as a hydroxyl group, carboxyl group, epoxy group and halogen group, on condition that the characteristics of the hydrogenated block copolymer (a) are not affected.

The hydrogenated block copolymer (a) can be prepared using any known technique. For example, the ion polymerization, including anionic polymerization and cationic polymerization, the single site polymerization, or the radical polymerization may be carried out to prepare a block copolymer having at least two polymer blocks composed mainly of a vinyl aromatic compound and at least one block copolymer composed mainly of a conjugated diene compound. Then, using a known technique, the resulting block copolymer is hydrogenated in an inactive organic solvent in the presence of a hydrogenation catalyst.

In the case of anionic polymerization, a vinyl aromatic compound and a conjugated diene compound are sequentially polymerized in an inactive organic solvent, such as n-hexane and cyclohexane, using a polymerization initiator, such as an alkyllithium compound. The polymerization is then stopped by adding an alcohol, a carboxylic acid, water, or other active hydrogen compounds to obtain a block copolymer having a desired molecular structure and a desired molecular weight and including at least two polymer blocks composed mainly of the vinyl aromatic compound and at least one polymer block composed mainly of the conjugate diene compound. The resulting block copolymer is hydrogenated in an inactive organic solvent in the presence of a hydrogenation catalyst, including a noble metal catalyst such as platinum, palladium or rhodium, which is carried by a proper carrier such as activated carbon, silica or alumina; Raney nickel; an organic nickel compound, an organic cobalt compound, or a composite catalyst that these compounds form with other organic metal compounds. In this manner, a hydrogenated block copolymer (a) can be obtained. The resulting hydrogenated block copolymer (a) may be used either individually or in combinations of two or more.

The thermoplastic polymer material (I) may contain a non-aromatic rubber softening agent to serve as the component (b) (which is referred to simply as "non-aromatic rubber softening agent (b)", hereinafter). Examples of the non-aromatic rubber softening agent (b) include paraffin-based process oil, naphthene-based process oil, white oil, mineral oil, oligomers formed from ethylene and α-olefins, paraffin wax, and liquid paraffin. These non-aromatic rubber softening agents may be used either individually or in combinations of two or more. Of these, paraffin-based process oil is particularly preferred.

The amount of the non-aromatic rubber softening agent (b) in the thermoplastic polymer material (I) is typically in the range of 0 to 120 parts by mass, preferably in the range of 0 to 110 parts by mass, with respect to 100 parts by mass of the hydrogenated block copolymer (a).

When the amount of the non-aromatic rubber softening agent (b) is more than 120 parts by mass with respect to 100 parts by mass of the hydrogenated block copolymer (a), the stretch material of the thermoplastic polymer material (I) becomes unfavorably sticky.

When necessary, the thermoplastic polymer material (I) may contain, as the third component (i.e., component (c)), a polyethylene that gives an MFR of 15 g/10 min or above when measured at 190° C. under a load of 2.16 kg. The polyethylene is preferably contained in the thermoplastic polymer material (I) in an amount of 80 parts by mass or less with respect to 100 parts by mass of the hydrogenated block copolymer (a). When present in an amount of 80 parts by mass or less, the polyethylene having an MFR that meets the above requirement can improve the processability of the thermoplastic polymer material (I).

Examples of the polyethylene include low-density polyethylene, high-density polyethylene, linear low-density polyethylene, and polyethylene polymerized by using metallocene catalyst. These polyethylenes may be used either individually or in combinations of two or more. Of these, linear low-density polyethylene is preferably used as the component (c).

When the polyethylene to serve as the component (c) has an MFR of less than 15 g/10 min when measured at 190° C. under a load of 2.16 kg, the processability of the thermoplastic polymer material (I) is decreased. Even in cases where the polyethylene is one that gives an MFR of 15 g/10 min or above when measured at 190° C. under a load of 2.16 kg, the permanent set as well as the strain relaxation property of the stretch material of the thermoplastic polymer material (I) will be reduced if the amount of the polyethylene exceeds 80 parts by mass with respect to 100 parts by mass of the hydrogenated block copolymer (a). The reduction in these properties in turn causes an increase both in the residual strain and in the permanent tensile set. As a result, the thermoplastic polymer material (I) becomes less stretchable.

When necessary, the thermoplastic polymer material (I) may contain, as the fourth component (i.e., component (d)), a polystyrene that gives an MFR of 5 g/10 min or above when measured at 200° C. under a load of 5.00 kg. The polystyrene is preferably contained in the thermoplastic polymer material (I) in an amount of 40 parts by mass or less with respect to 100 parts by mass of the hydrogenated block copolymer (a). When present in an amount of 40 parts by mass or less, the polystyrene having an MFR that meets the above requirement can reduce the residual strain and the permanent tensile set of the thermoplastic polymer resin (I).

Styrene homopolymer can be used as the polystyrene to serve as the component (d).

When the polystyrene to serve as the component (d) is one that gives an MFR of less than 5 g/10 min when measured at 200° C. under a load of 5.00 kg, the processability of the thermoplastic polymer material (I) is decreased. Even in cases where the polystyrene is one that gives an MFR of 5 g/10 min or above when measured at 200° C. under a load of 5.00 kg, the processability of the thermoplastic polymer material (I) will be lost if the amount of the polystyrene exceeds 40 parts by mass with respect to 100 parts by mass of the hydrogenated block copolymer (a).

The thermoplastic polymer material (I) to form the stretch material of the present invention is composed of 100 parts by mass of the hydrogenated block copolymer (a), 0 to 120 parts by mass of the non-aromatic rubber softening agent (b), 0 to 80 parts by mass of the polyethylene (c) that gives an MFR of 15 g/10 min or above when measured at 190° C. under a load of 2.16 kg, and/or 0 to 40 parts by mass of the polystyrene (d) that gives an MFR of 15 g/10 min or above when measured at 200° C. under a load of 5.00 kg. At the same time, the thermoplastic polymer material (I) must have the following physical properties: it has a residual strain of 15% or less after having stretched to 150% elongation at 25° C. in a stretch test; it has a permanent tensile set of 10% or less when the thermoplastic material is stretched by 100% elongation, held stretched for 120 minutes at 25° C., released and then left for 30 minutes; it shows a 15% or less deviation in the value of the melt tension when tested in a melt tension test performed under a temperature condition that allows an MFR of 5 to 15 g/10 min; and it melts and breaks when wound at a winding speed of 60 m/min or more in a melt tension test performed under a temperature condition that allows an MFR of 5 to 15 g/10 min.

Given that the above conditions are met, the thermoplastic polymer material (I) exhibits a good melt processability during high-speed production. For example, when the thermoplastic polymer material (I) is processed on a melt-blown non-woven fabric-forming apparatus at a temperature of 290° C., non-woven fabrics made of uniform thin fibers can be produced smoothly.

When necessary, the thermoplastic polymer material (I) may contain, aside from the above-described components, a heat stabilizer, an antioxidant, a light stabilizer, an antistatic, a lubricant, and other additives.

The thermoplastic polymer material (I) can be produced by using any known technique. When it is desired to produce the thermoplastic polymer material (I) as a composition containing the hydrogenated block copolymer (a) along with other components, it can be produced by mixing and kneading, with a twin screw extruder, the following components: the hydrogenated block copolymer (a); and optionally, the non-aromatic rubber softening agent (b); the polyethylene (c) having an MFR that meets the above-specified conditions; and/or the polystyrene having an MFR that meets the above-specified conditions. Alternatively, a Banbury mixer, or a kneader, each known as a typical rubber mixer/kneader, may be used in place of the extruder.

The stretch material made of the thermoplastic polymer material (I) may be provided in any desired form suitable for each application, which may vary depending on each application and the manner by which the stretch material is used. The stretch material of the thermoplastic polymer material (I) is typically provided in the form of films, strands, bands, or non-woven fabrics.

When the stretch material is provided in the form of film, it may have any thickness and width that are properly selected. Preferably, the film is from about 15 μm to about 200 μm thick. When the stretch material is provided in the form of a strand, it may be formed into strands or strings having a circular, elliptic, square-shaped, or other properly shaped cross-section. Similarly, when the stretch material is provided in the form of a band, it may have any thickness and width that are properly selected. Preferably, the band is from about 200 μm to about 2 mm thick. Also, when the stretch material is provided in the form of a non-woven fabric, features of the fabric, such as the fineness of the fibers to form the fabric and the basic weight of the fabric, are selected to suit each application. In general, it is preferred that the fibers to form the non-woven fabric are continuous fibers with uniform fineness since such fibers can provide high mechanical strength. Also, the basic weight of the non-woven fabric is preferably in the range of 5 to 200 g/m in view of readiness in handling the non-woven fabric.

The thermoplastic polymer material (I) can be formed into a stretch material by a technique properly selected depending on the particular form of the stretch material. For example, when it is desired to shape the thermoplastic polymer material into films, strands, or non-woven fabrics, the shaping processes commonly used for respective purposes are preferably employed. For example, films and strands are formed by using a single screw or twin screw extruder. Non-woven fabrics are formed, for example, by melt-spinning the thermoplastic polymer material (I) on a common melt-blown non-woven fabric-forming apparatus, and forming the resulting fibers into fibrous webs on a collection surface. Non-woven fabrics-like stretch materials can also be formed by using a spunbond technique.

While the stretch material of the present invention can be used as a stretchable article without any processing, it can be laminated and bonded with at least one stretchable cloth selected from stretchable cloths and pleated clothes that can be stretched at least in one direction. In this manner, the shape stability of the stretch material can be improved, making the material suitable to be formed into stretchable articles with complex shape often required in sanitary products such as disposable diapers, toilet training pants, and medical products such as substrate of medical patches, stretchable tapes, surgical bandages, and surgical gowns.

EXAMPLES

The present invention will now be described with reference to examples, which are not intended to limit the scope of the invention in any way.

In the following reference examples, the number average molecular weight is determined by the GPC technique using polystyrene standard. The degree of hydrogenation, styrene content, and the amount of bound vinyl groups of the hydrogenated block copolymer were determined by $^1$H-NMR.

In the following Examples and Comparative Examples, the stretchability (i.e., residual strain, and permanent tensile set), the deviation in the value of the melt tension measured in a melt tension test, the winding speed that causes the material to melt and break, and the processability of the thermoplastic polymer material used to make the stretch material were evaluated as follows:

[Residual Strain of the Thermoplastic Polymer Material]

On a pressing machine, chips of a thermoplastic polymer material (a thermoplastic polymer or a thermoplastic polymer composition) were formed into a 1 mm thick sheet. From this sheet, a No.2 dumbbell-shaped sample piece according to JIS K-6251 was stamped out. The sample piece was mounted on an Instron universal tensile tester with a distance between grips of 70 mm. With an ambient temperature of 25° C., the sample piece was stretched at a test speed of 20 mm/min to 150% elongation and was then returned at the same speed until the strain measures zero. The amount of set at this point was measured.

[Permanent Tensile Set of the Thermoplastic Polymer Material]

On a pressing machine, chips of a thermoplastic polymer material (a thermoplastic polymer or a thermoplastic polymer composition) were formed into a 1 mm thick sheet. From this sheet, a No.2 sample strip, 10 mm wide and 60 mm long, was stamped out. This sample piece was marked with two reference lines that were 2 cm apart. The sample piece was then stretched by 100% elongation, held stretched for 120 minutes at an ambient temperature of 25° C., and then released. After 30 minutes, the distance between the reference lines was measured and the permanent tensile set was determined by the following equation.

Permanent tensile set $(\%)=[(L-2)/2]\times 100$ (where L indicates the distance (cm) between the reference lines after the test)

[Melt Tension Test of the Thermoplastic Polymer Material]

(a) Measurement of Deviation in the Value of the Melt Tension

Using a Capirograph ("1B" manufactured by Toyo Seiki Co., Ltd.), the melt tension of a thermoplastic polymer material (a thermoplastic polymer or a thermoplastic polymer composition) was measured at a piston speed of 20 mm/min and a winding speed of 10 mm/min. The test was conducted under a temperature condition that allows an MFR of 5 to 15 g/10 min when a load of 2.16 kg was applied. Deviation in the measurements was determined.

(b) Measurements of the Winding Speed that Causes the Material to Melt and Break Using a Capirograph ("1B" manufactured by Toyo Seiki Co., Ltd.), a thermoplastic polymer material (a thermoplastic polymer or a thermoplastic polymer composition) was wound at a piston speed of 20 mm/min. The winding speed at which the polymer material melted and broke was measured. The test was conducted under a temperature condition that allows an MFR of 5 to 15 g/10 min when a load of 2.16 kg was applied.

[Evaluation of the Processability of the Thermoplastic Polymer Material]

(1) Film

Using a film-forming apparatus of T-die type ($\Phi$=90 mm, L/D=25, die width=1040 mm), an 80 μm thick film was extruded at 260° C. while the discharge volume was controlled to give a uniform film thickness. During the process, the line speed was varied and ratings were made as follows: a circle signifies a good processability, indicating that the film thickness was maintained at 80 μm even when the line speed was 50 m/min or above; and a cross signifies a poor processability, indicating that either the uniform film thickness was not maintained or film was not formed unless the line speed was less than 50 m/min.

(2) Band

Using a band-forming apparatus of T-die type ($\Phi$=30 mm, L/D=18, die width=25 mm), a band was extruded at 250° C. while the line speed was varied. The resulting band was visually observed and ratings were made as follows: a circle signifies a good processability, indicating that the band thickness was maintained at 300 μm even when the line speed was 70 m/min or above; and a cross signifies a poor processability, indicating that the uniform band thickness was not maintained unless the line speed was less than 70 m/min.

(3) Non-Woven Fabric

Using the melt-blown technique, a non-woven fabric made of fine fibers with a fineness of about 5 µm was formed on a melt-blown non-woven fabric-forming apparatus at a die temperature of 290° C. Ratings were made as follows: a circle signifies a good processability, indicating that the non-woven fabric was formed of continuous fibers with uniform thickness; and a cross signifies a poor processability, indicating that the non-woven fabric was formed of short fibers with uneven thickness.

Reference Example 1

[Production of Hydrogenated Block Copolymer]

Using s-butyllithium as a polymerization initiator, styrene, and isoprene, butadiene or a mixture of isoprene and butadiene was allowed to undergo anionic polymerization in cyclohexane to obtain an ABA-type triblock copolymer in which a styrene polymer block is attached to each end of a polymer block consisting of a conjugated diene compound. Using a Ziegler catalyst, the resulting triblock copolymer was hydrogenated for 5 hours at 75° C. in cyclohexane under an atmosphere with a hydrogen pressure of 0.8 MPa. This resulted in hydrogenated block copolymers 1 through 5 having respective physical properties as shown in Table 1 below.

TABLE 1

|  | styrene content (wt %) | isoprene/ butadiene ratio (wt %) | hydrogenated ratio (%) | a number average molecular weight | amount of bound vinyl groups (%) |
| --- | --- | --- | --- | --- | --- |
| hydrogenated block copolymer 1 | 18 | 100/0 | 98 | 93,000 | 8 |
| hydrogenated block copolymer 2 | 18 | 0/100 | 97 | 103,000 | 50 |
| hydrogenated block copolymer 3 | 30 | 50/50 | 98 | 121,000 | 9 |
| hydrogenated block copolymer 4 | 30 | 100/0 | 97 | 43,000 | 8 |
| hydrogenated block copolymer 5 | 30 | 50/50 | 96 | 153,000 | 8 |

Example 1

(1) The hydrogenated block copolymer 1 obtained in Reference Example 1 was fed into a twin screw extruder, melt-kneaded at 230° C., extruded, and then cut into chips of the hydrogenated block copolymer 1. The chips so obtained were examined in the above-described manner for the residual strain, the permanent tensile set, the deviation in the value of the melt tension, and the winding speed that causes the material to melt/break. The results are shown in Table 2 below.

(2) Using a melt-blown non-woven fabric-forming apparatus, the chips of the hydrogenated copolymer 1 obtained in (1) above were melt-blown at a temperature of 290° C. onto a collection surface to a basic weight of 40 g/m². The copolymer 1 was then pressed against the surface using a roller to obtain a 0.2 mm thick stretchable non-woven fabric. This non-woven fabric was formed of continuous thin fibers with a fineness of about 5 µm and showed a good processability during production (indicated by a circle).

Example 2

(1) The hydrogenated block copolymer 2 obtained in Reference Example 1 was fed into a twin screw extruder, melt-kneaded at 230° C., extruded, and then cut into chips of the hydrogenated block copolymer 2. The chips so obtained were examined in the above-described manner for the residual strain, the permanent tensile set, the deviation in the value of the melt tension, and the winding speed that causes the material to melt/break. The results are shown in Table 2 below.

(2) On a band-forming apparatus of T-die type (Φ=30 mm, L/D=18, die width=25 mm), the chips of the hydrogenated block copolymer 2 obtained in (1) above were melt-extruded at 250° C. at a line speed of 70 m/min to obtain a 300 µm thick, 20 mm wide band with a square cross-section. The band was evaluated in the above-described manner and proved to have a good processability during the production (indicated by a circle).

Example 3

(1) 20 parts by mass of polyethylene (Product name: UJ480, manufactured by Japan Polychem corporation, MFR=30 g/10 min (190° C., 2.16 kg)) were blended with 100 parts by mass of the hydrogenated block copolymer 1 obtained in Reference Example 1. Using a twin screw extruder, the resulting mixture was melt-kneaded at 230° C., extruded, and then cut into chips of the thermoplastic polymer composition. The chips so obtained were examined in the above-described manner for the residual strain, the permanent tensile set, the deviation in the value of the melt tension, and the winding speed that causes the material to melt/break. The results are shown in Table 2 below.

(2) On a film-forming apparatus of T-die type (Φ=90 mm, L/D=25, die width=1040 mm), the chips of the thermoplastic polymer composition obtained in (1) above were formed into a film with a uniform thickness (80 µm thick). The process was carried out at a temperature of 260° C. and at a line speed of 50 m/min. The film was evaluated in the above-described manner and turned out to have a good processability during the production (indicated by a circle).

Example 4

(1) 100 parts by mass of paraffin-based process oil (Product name: Diana process oil PW-380, manufactured by Idemitsu Kosan Co., Ltd.) and 40 parts by mass of polyethylene (Product name: UJ480, manufactured by Japan Polychem corporation, MFR=30 g/10 min (190° C., 2.16 kg))

were blended with 100 parts by mass of the hydrogenated block copolymer 3 obtained in Reference Example 1. Using a twin screw extruder, the resulting mixture was melt-kneaded at 230° C., extruded, and then cut into chips of the thermoplastic polymer composition. The chips so obtained were examined in the above-described manner for the residual strain, the permanent tensile set, the deviation in the value of the melt tension, and the winding speed that causes the material to melt/break. The results are shown in Table 2 below.

(2) Using a melt-blown non-woven fabric-forming apparatus, the chips of the thermoplastic polymer composition obtained in (1) above were melt-blown at a temperature of 290° C. onto a collection surface to a basic weight of 40 g/m². The polymer composition was then pressed against the surface using a roller to obtain a 0.2 mm thick stretchable non-woven fabric. This non-woven fabric was formed of continuous thin fibers with a fineness of about 5 μm and showed a good processability during production (indicated by a circle).

Example 5

(1) 20 parts by mass of polystyrene (product name: HF77, A & M styrene Co., Ltd., MFR=7.7 g/10 min (200° C., 5.00 kg)) were blended with 100 parts by mass of the hydrogenated block copolymer 1 obtained in Reference Example 1. Using a twin screw extruder, the resulting mixture was melt-kneaded at 230° C., extruded, and then cut into chips of the thermoplastic polymer composition. The chips so obtained were examined in the above-described manner for the residual strain, the permanent tensile set, the deviation in the value of the melt tension, and the winding speed that causes the material to melt/break. The results are shown in Table 2 below.

(2) On a band-forming apparatus of T-die type (Φ=30 mm, L/D=18, die width=25 mm), the chips of the thermoplastic polymer composition obtained in (1) above were melt-extruded at 260° C. at a line speed of 70 m/min to obtain a 300 μm thick, 20 mm wide band with a square cross-section. The band was evaluated in the above-described manner and proved to have a good processability during the production (indicated by a circle).

Comparative Example 1

(1) The hydrogenated block copolymer 4 obtained in Reference Example 1 was fed into a twin screw extruder, melt-kneaded at 230° C., extruded, and then cut into chips of the hydrogenated block copolymer 4. The chips so obtained were examined in the above-described manner for the residual strain, the permanent tensile set, the deviation in the value of the melt tension, and the winding speed that causes the material to melt/break. The results are shown in Table 3 below.

(2) Qn a band-forming apparatus of T-die type (Φ=30 mm, L/D=18, die width=25 mm), the chips of the hydrogenated block copolymer 4 obtained in (1) above were melt-extruded at 200° C. at a line speed of 70 m/min. However, the process failed to provide desired band products having a uniform thickness, thus proving the poor processability of the block copolymer 4 (indicated by a cross).

Comparative Example 2

(1) 100 parts by mass of paraffin-based process oil (Product name: Diana process oil PW-380, manufactured by Idemitsu Kosan Co., Ltd.) and 30 parts by mass of polypropylene (Product name: S106LA, manufactured by Grand Polymer Co., Ltd., MFR=15 g/10 min (230° C., 2.16 kg)) were blended with 100 parts by mass of the hydrogenated block copolymer 3 obtained in Reference Example 1. Using a twin screw extruder, the resulting mixture was melt-kneaded at 230° C., extruded, and then cut into chips of the thermoplastic polymer composition. The chips so obtained were examined in the above-described manner for the residual strain, the permanent tensile set, the deviation in the value of the melt tension, and the winding speed that causes the material to melt/break. The results are shown in Table 3 below.

(2) Using the same melt-blown non-woven fabric-forming apparatus as in Example 1, the chips of the thermoplastic polymer composition obtained in (1) above were melt-blown at a temperature of 290° C. onto a collection surface to a basic weight of 40 g/m². The polymer composition was then pressed against the surface using a roller to obtain a 0.2 mm thick stretchable non-woven fabric. The non-woven fabric so obtained was formed mainly of short fibers with uneven fineness, rather than uniform continuous thin fibers. The thermoplastic polymer composition thus proved to have a poor processability during production (indicated by a cross).

Comparative Example 3

(1) 75 parts by mass of paraffin-based process oil (Product name: Diana process oil PW-380, manufactured by Idemitsu Kosan Co., Ltd.) and 30 parts by mass of polyethylene (Product name: 1520L, manufactured by Mitsui Chemicals Inc., MFR=2.3 g/10 min (190° C., 2.16 kg)) were blended with 100 parts by mass of the hydrogenated block copolymer 3 obtained in Reference Example 1. Using a twin screw extruder, the resulting mixture was melt-kneaded at 230° C., extruded, and then cut into chips of the thermoplastic polymer composition. The chips so obtained were examined in the above-described manner for the residual strain, the permanent tensile set, the deviation in the value of the melt tension, and the winding speed that causes the material to melt/break. The results are shown in Table 3 below.

(2) Using a film-forming apparatus of T-die type (Φ=90 mm, L/D=25, die width=1040 mm), an attempt was made to form the chips of the thermoplastic polymer composition obtained in (1) above into a film. The process was carried out at a line speed of 50 m/min. The formed products broke halfway through, however, and desired film was not obtained.

Comparative Example 4

(1) 100 parts by mass of polyethylene (Product name: UJ480, manufactured by Japan Polychem corporation, MFR=30 g/10 min (190° C., 2.16 kg)) were blended with 100 parts by mass of the hydrogenated block copolymer 1 obtained in Reference Example 1. Using a twin screw extruder, the resulting mixture was melt-kneaded at 230° C., extruded, and then cut into chips of the thermoplastic polymer composition. The chips so obtained were examined in the above-described manner for the residual strain, the permanent tensile set, the deviation in the value of the melt tension, and the winding speed that causes the material to melt/break. The results are shown in Table 3 below.

(2) On a band-forming apparatus of T-die type (Φ=30 mm, L/D=18, die width=25 mm), the chips of the thermoplastic polymer composition obtained in (1) above were melt-extruded at 250° C. at a line speed of 70 m/min to obtain a 300 μm thick, 20 mm wide band with a square cross-section. This band exhibited a relatively poor stretchability, as did the thermoplastic polymer composition.

Comparative Example 5

(1) 100 parts by mass of paraffin-based process oil (Product name: Diana process oil PW-380, manufactured by Idemitsu Kosan Co., Ltd.) and 40 parts by mass of polyethylene (Product name: UJ480, manufactured by Japan Polychem corporation, MFR=30 g/10 min (190° C., 2.16 kg)) were blended with 100 parts by mass of the hydrogenated block copolymer 5 obtained in Reference Example 1. Using a twin screw extruder, the resulting mixture was melt-kneaded at 230° C., extruded, and then cut into chips of the thermoplastic polymer composition. The chips so obtained were examined in the above-described manner for the residual strain, the permanent tensile set, the deviation in the value of the melt tension, and the winding speed that causes the material to melt/break. The results are shown in Table 3 below.

(2) Using a melt-blown non-woven fabric-forming apparatus, the chips of the thermoplastic polymer composition obtained in (1) above were melt-blown at a temperature of 290° C. onto a collection surface to a basic weight of 40 g/m². The process failed to produce desired non-woven fabric, however.

TABLE 2

|  | ex. 1 | ex. 2 | ex. 3 | ex. 4 | ex. 5 |
|---|---|---|---|---|---|
| [component of a thermoplastic polymer material] hydrogenated block copolymer | | | | | |
| 1 | 100 | | 100 | | 100 |
| 2 | | 100 | | | |
| 3 | | | | 100 | |
| 4 | | | | | |
| 5 | | | | | |
| paraffin-based process oil[1] | | | | 100 | |
| PE-1[2] | | | 20 | 40 | |
| PE-2[3] | | | | | |
| PS[4] | | | | | 20 |
| PP[5] | | | | | |
| [property of a thermoplastic polymer material] | | | | | |
| MFR(g/10 min) | 6 | 4 | 10 | 12 | 8 |
| (measured temperature) | (230° C.) | (230° C.) | (230° C.) | (200° C.) | (250° C.) |
| residual strain (%) | 8 | 7 | 10 | 11 | 7 |
| permanent tensile set (%) | 7 | 7 | 7 | 7 | 5 |
| deviation in the value of the melt tension (%) | 4 | 6 | 5 | 7 | 10 |
| winding speed that causes the material to melt and break (m/min) | 141 | 104 | 160 | 94 | 70 |
| [processability of forming stretch material] form of stretch material | non-woven fabric | band | film | non-woven fabric | band |
| evaluated result | ○ | ○ | ○ | ○ | ○ |

[1] paraffin-based process oil: Diana process oil PW-380, manufactured by Idemitsu Kosan Co., Ltd.
[2] PE-1: polyethylene (UJ480, manufactured by Japan Polychem corporation, MFR = 30 g/10 min (190° C., 2.16 kg)
[3] PE-2: polyethylene (1520L, manufactured by Mitsui Chemicals Inc., MFR = 2.3 g/10 min (190° C., 2.16 kg)
[4] PS: polystyrene (HF77, A & M styrene Co., Ltd., MFR = 7.7 g/10 min (200° C., 5.00 kg)
[5] PP: polypropylene (S106LA, manufactured by Grand Polymer Co., Ltd., MFR = 15 g/10 min (230° C., 2.16 kg)

TABLE 3

|  | cf. 1 | cf. 2 | cf. 3 | cf. 4 | cf. 5 |
|---|---|---|---|---|---|
| [component of a thermoplastic polymer material] hydrogenated block copolymer | | | | | |
| 1 | | | | 100 | |
| 2 | | | | | |
| 3 | | | 100 | 100 | |
| 4 | 100 | | | | |
| 5 | | | | | 100 |
| paraffin-based process oil[1] | | 100 | 75 | | 100 |
| PE-1[2] | | | | 100 | 40 |
| PE-2[3] | | | 30 | | |
| PS[4] | | | | | |
| PP[5] | | 30 | | | |

TABLE 3-continued

|  | cf. 1 | cf. 2 | cf. 3 | cf. 4 | cf. 5 |
|---|---|---|---|---|---|
| [property of a thermoplastic polymer material] | | | | | |
| MFR(g/10 min) | 10 | 15 | 5 | 15 | 5 |
| (measured temperature) | (180° C.) | (200° C.) | (200° C.) | (190° C.) | (280° C.) |
| residual strain (%) | 10 | 6 | 14 | 42 | 8 |
| permanent tensile set (%) | 15 | 5 | 6 | 33 | 5 |
| deviation in the value of the melt tension (%) | 25 | 8 | 4 | 9 | — |
| winding speed that causes the material to melt and break (m/min) | 41 | 46 | 13 | 130 | <10 |
| [processability of forming stretch material] | band | non-woven fabric | film | band | non-woven fabric |
| form of stretch material | | | | | |
| evaluated result | X | X | X | ○ | X |

[1] paraffin-based process oil: Diana process oil PW-380, manufactured by Idemitsu Kosan Co., Ltd.
[2] PE-1: polyethylene (UJ480, manufactured by Japan Polychem corporation, MFR = 30 g/10 min (190° C., 2.16 kg)
[3] PE-2: polyethylene (1520L, manufactured by Mitsui Chemicals Inc., MFR = 2.3 g/10 min (190° C., 2.16 kg)
[4] PS: polystyrene (HF77, A & M styrene Co., Ltd., MFR = 7.7 g/10 min (200° C., 5.00 kg)
[5] PP: polypropylene (S106LA, manufactured by Grand Polymer Co., Ltd., MFR = 15 g/10 min (230° C., 2.16 kg)

As can be seen from the results shown in Table 2 above, each of the stretch materials of Examples 1 through 5 exhibits a good stretchability and offers a good processability, the property required during the production of the stretch materials from the respective thermoplastic polymer materials. Specifically, the stretch materials each proved to have a good melt-processability that makes the material suitable for high-speed production. This is due to the fact that each of the stretch materials of Examples 1 through 5 is made of the thermoplastic polymer material (a thermoplastic polymer or a thermoplastic polymer composition) that meets the following conditions: each one is composed of a) 100 parts by mass of the hydrogenated block copolymer 1, 2, or 3, which has a number average molecular weight of 50,000 to 140,000 and includes two polymer blocks composed of styrene and one hydrogenated polymer block composed of isoprene and/or butadiene, wherein the amount of the styrene polymer block is in the range of 10 to 40% by mass, b) 0 to 120 parts by mass of the non-aromatic rubber softening agent, c) 0 to 80 parts by mass of polyethylene that has an MFR of 15 g/10 min or above (190° C., 2.16 kg), and d) 0 to 40 parts by mass of polystyrene that has an MFR of 5 g/10 min or above (200° C., 5.00 kg); each has a residual strain of 15% or less after having stretched to 150% elongation at 25° C. in a stretch test; each has a permanent tensile set of 10% or less when the thermoplastic material is stretched by 100% elongation, held stretched for 120 minutes at 25° C., released and then left for 30 minutes; each shows a 15% or less deviation in the value of the melt tension when tested in a melt tension test performed under a temperature condition that allows an MFR of 5 to 15 g/10 min; and each melts and breaks when wound at a winding speed of 60 m/min or more in a melt tension test performed under a temperature condition that allows an MFR of 5 to 15 g/10 min.

In comparison, as can be seen from the results of Table 3, the hydrogenated block copolymer 4 used to make the stretch material in Comparative Example 1 has a number average molecular weight of 43,000, which falls outside the range specified by the present invention, and thus has an unfavorable permanent tensile set and a decreased formability.

The thermoplastic polymer composition used in Comparative Example 2, on the other hand, uses polypropylene falling outside the range specified in the present invention, and therefore cannot provide sufficient processability required in the production of the stretch material.

In Comparative Example 3, the polyethylene used to prepare the thermoplastic polymer material has an MFR of 2.3 g/10 min (190° C., 2.16 kg), which lies outside the range specified by the present invention. Thus, the material also cannot provide sufficient processability required in the production of the stretch material from the thermoplastic polymer composition.

In Comparative Example 4, the polyethylene used to prepare the thermoplastic polymer composition is added in an amount of 100 parts by mass with respect to 100 parts by mass of the hydrogenated block copolymer 2, which also falls outside the range specified by the present invention. The thermoplastic polymer composition in this example therefore has excessively large residual strain and permanent tensile set, resulting in a significantly reduced stretchability of the stretch material.

In Comparative Example 5, the hydrogenated block copolymer 5 used to prepare the thermoplastic polymer composition has a number average molecular weight of 153,000, which lies outside the range specified by the present invention, so that the material fails to provide sufficient processability required in the production of the stretch material.

INDUSTRIAL APPLICABILITY

The stretch material of the present invention offers a good stress relaxation property and a less residual strain and is nearly as stretchable and flexible as vulcanized rubber. For this reason, the stretch material of the present invention can be effectively used in various applications. In particular, when used in sanitary products such as disposable diapers, and medical products such as substrate of medical patches, stretchable tapes, surgical bandages, and surgical gowns, the stretch material of the present invention readily stretches or contracts to better fit a human body without causing undesired irritation or exerting undesired pressure on the human body.

Having a good processability, in particular, a good melt-processability suitable for high-speed production, the thermoplastic polymer material (I) for use in the stretch material of the present invention can be effectively produced or formed with good productivity. The stretch material so produced can then be attached to a stretchable cloth by means of heat-sealing or other binding techniques. In this way, various stretchable articles can be produced in a simple and reliable manner.

The thermoplastic polymer material (I) for use in the stretch material of the present invention, as well as the stretch material of the present invention formed of the thermoplastic polymer material (I), does not contain any potential environmental pollutant and is highly safe and clean. These materials are therefore applicable in a wide range of applications and are particularly suitable for use in the aforementioned applications including sanitary products such as disposable diapers, toilet training pants, and medical products such as substrate for medical patches, stretchable tapes, surgical bandages, and surgical gowns.

The invention claimed is:

1. A stretch material consisting essentially of a thermoplastic polymer material that meets the following conditions:
   (i) the thermoplastic polymer material contains:
      (a) 100 parts by weight of a hydrogenated block copolymer having a number average molecular weight of 50,000 to 140,000 and comprising at least two polymer blocks (A) composed mainly of a vinyl aromatic compound and at least one hydrogenated polymer block (B) composed mainly of a conjugated diene compound, wherein the amount of polymer block (A) is in the range of 10 to 40% by weight, and 50% or more of the double bonds present in the copolymer block (B) that originate from the conjugated diene compound are hydrogenated;
      (b) 0 to 120 parts by weight of a non-aromatic rubber softening agent;
      (c) 0 to 80 parts by weight of polyethylene that has an MFR of 15 g/10 min or above when measured at 190° C. under a load of 2.16 kg; and
      (d) 0 to 40 parts by weight of polystyrene that has an MFR of 5 g/10 min or above when measured at 200° C. under a load of 5.00 kg;
   (ii) the thermoplastic polymer material has a residual strain of 15% or less after having been stretched to 150% elongation at 25° C. in a stretch test;
   (iii) the thermoplastic polymer material has a permanent tensile set of 10% or less when the thermoplastic material is stretched to an elongation of 100%, and held in the stretched state for 120 minutes at 25° C., released and then left for 30 minutes;
   (iv) the thermoplastic polymer material shows a 15% or less deviation in the value of the melt tension when tested in a melt tension test performed under a temperature condition that allows an MFR of 5 to 15 g/10 min; and
   (v) the thermoplastic polymer material melts and breaks when wound at a winding speed of 60 m/min or more in a melt tension test performed under a temperature condition that allows an MFR of 5 to 15 g/10 min.

2. The stretch material according to claim 1, wherein the stretch material is provided in the form of a film, a strand, a band or a non-woven fabric formed of the thermoplastic polymer material.

3. The stretch material according to claim 1, wherein the conjugated diene compound that constitutes the hydrogenated polymer block (B) is butadiene, isoprene, or a mixture of the two.

4. The stretch material according to claim 1, wherein the content of polymer block (A) in the hydrogenated block copolymer (a) ranges from 13 to 37% by weight.

5. The stretch material according to claim 1, wherein the vinyl aromatic compound that constitutes polymer block (A) is styrene, α-methylstyrene, o-methylstyrene, m-methylstyrene, p-methylstyrene, 1,3-dimethyistyrene, vinylnaphthalene or vinylanthracene.

6. The stretch material according to claim 1, wherein the conjugated diene compound that constitutes polymer block (B) is butadiene, isoprene, 1,3-pentadiene, 2,3-dimethyl-1,3-butadiene or chloroprene.

7. The stretch material according to claim 1, wherein the polymer block (B) is hydrogenated to an extent of at least 80% of the double bonds that originate from the conjugated diene compound.

8. The stretch material according to claim 1, wherein the number average molecular weight of the hydrogenated block copolymer (a) ranges from 55,000 to 135,000.

9. The stretch material according to claim 1, wherein the non-aromatic rubber softening agent (b) is selected from the group consisting of paraffin-based process oil, naphthene-based process oil, white oil, mineral oil, oligomers formed from ethylene and α-olefins, paraffin wax and liquid paraffin.

10. The stretch material according to claim 1, wherein the polyethylene is a low-density polyethylene, a high-density polyethylene, a linear low-density polyethylene or a polyethylene prepared by the polymerization of ethylene in the presence of a metallocene catalyst.

11. A stretch material consisting essentially of a thermoplastic polymer material that meets the following conditions:
   (i) the thermoplastic polymer material contains:
      (a) 100 parts by weight of a hydrogenated block copolymer having a number average molecular weight of 50,000 to 140,000 and comprising at least two polymer blocks (A) composed mainly of a vinyl aromatic compound and at least one hydrogenated polymer block (B) composed mainly of a conjugated diene compound, wherein the amount of polymer block (A) is in the range of 10 to 40% by weight, and 50% or more of the double bonds present in the copolymer block (B) that originate from the conjugated diene compound are hydrogenated;
      (b) 0 to 120 parts by weight of a non-aromatic rubber softening agent;
      (c) 0 to 80 parts by weight of polyethylene that has an MFR of 15 g/10 min or above when measured at 190° C. under a load of 2.16 kg;
      (d) 0 to 40 parts by weight of polystyrene that has an MFR of 5 g/10 min or above when measured at 200° C. under a load of 5.00 kg; and
      (f) at least one additive selected from the group consisting of a heat stabilizer, an antioxidant, a light stabilizer, an antistatic material and a lubricant;
   (ii) the thermoplastic polymer material has a residual strain of 15% or less after having been stretched to 150% elongation at 25° C. in a stretch test;
   (iii) the thermoplastic polymer material has a permanent tensile set of 10% or less when the thermoplastic material is stretched to an elongation of 100%, and held in the stretched state for 120 minutes at 25° C., released and then left for 30 minut (iv) the thermoplastic polymer material shows a 15% or less deviation in the value of the melt tension when tested in a melt tension test performed under a temperature condition that allows an MFR of 5 to 15 g/10 min; and (v) the thermoplastic polymer material melts and breaks when wound at a winding speed of 60 m/min or more in a melt tension test performed under a temperature condition that allows an MFR of 5 to 15 g/10 min.

* * * * *